United States Patent [19]
Morgan, Jr.

[11] 3,814,261
[45] June 4, 1974

[54] FILTER FOR LIQUID MATERIAL
[75] Inventor: Howard William Morgan, Jr., Michigan City, Ind.
[73] Assignee: Filter Specialists, Inc., Michigan City, Ind.
[22] Filed: Jan. 22, 1973
[21] Appl. No.: 325,578

[52] U.S. Cl.................. 210/453, 210/484, 210/491
[51] Int. Cl............................................ B01d 29/14
[58] Field of Search .......... 210/445, 448, 452, 453, 210/484, 491

[56] References Cited
UNITED STATES PATENTS
| | | | |
|---|---|---|---|
| 2,097,828 | 11/1937 | Baldwin | 210/453 X |
| 3,003,643 | 10/1961 | Thomas | 210/491 |
| 3,640,392 | 2/1972 | Smith et al. | 210/453 X |
| 3,771,664 | 11/1973 | Schrink et al. | 210/448 |

Primary Examiner—Charles N. Hart
Assistant Examiner—Richard W. Burks
Attorney, Agent, or Firm—Oltsch & Knoblock

[57] ABSTRACT

A filter which includes a housing having a liquid inlet and a liquid outlet formed therein. A reticulated basket is fitted and supported within the housing in a spaced relationship from the housing side wall. A filter bag is fitted within the reticulated basket and is supported by the basket in sealing engagement with a cap applied over the housing. The cap includes an upwardly offset marginal portion which in cooperation with the inlet into the filter housing defines a passageway by which liquid can enter the housing and pass upwardly and over the upper marginal edge of the filter bag, down into the bag, through the bag, and out the liquid outlet.

13 Claims, 7 Drawing Figures

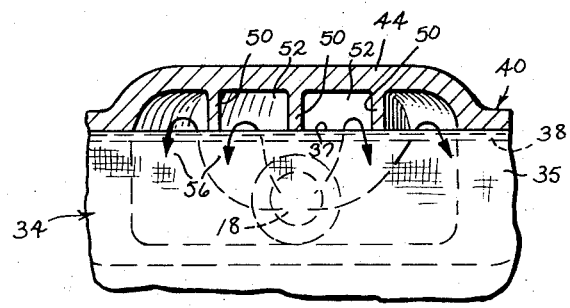
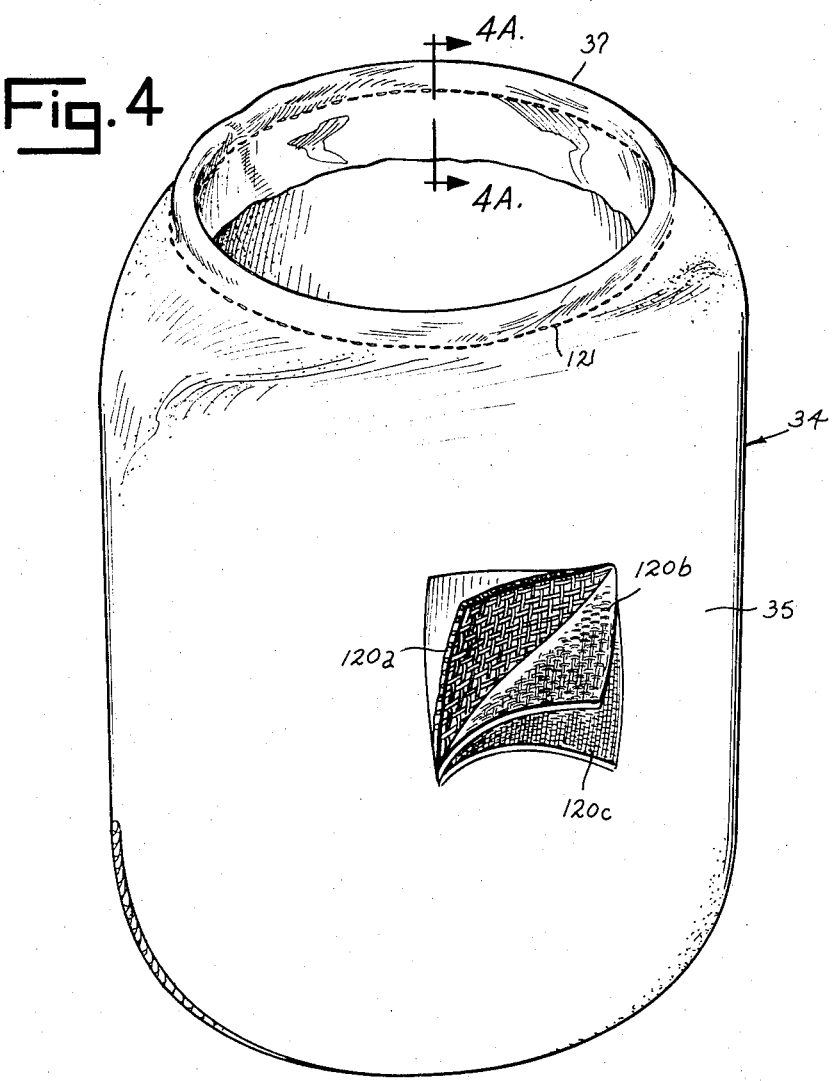
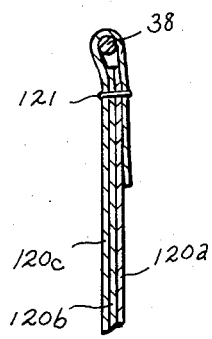

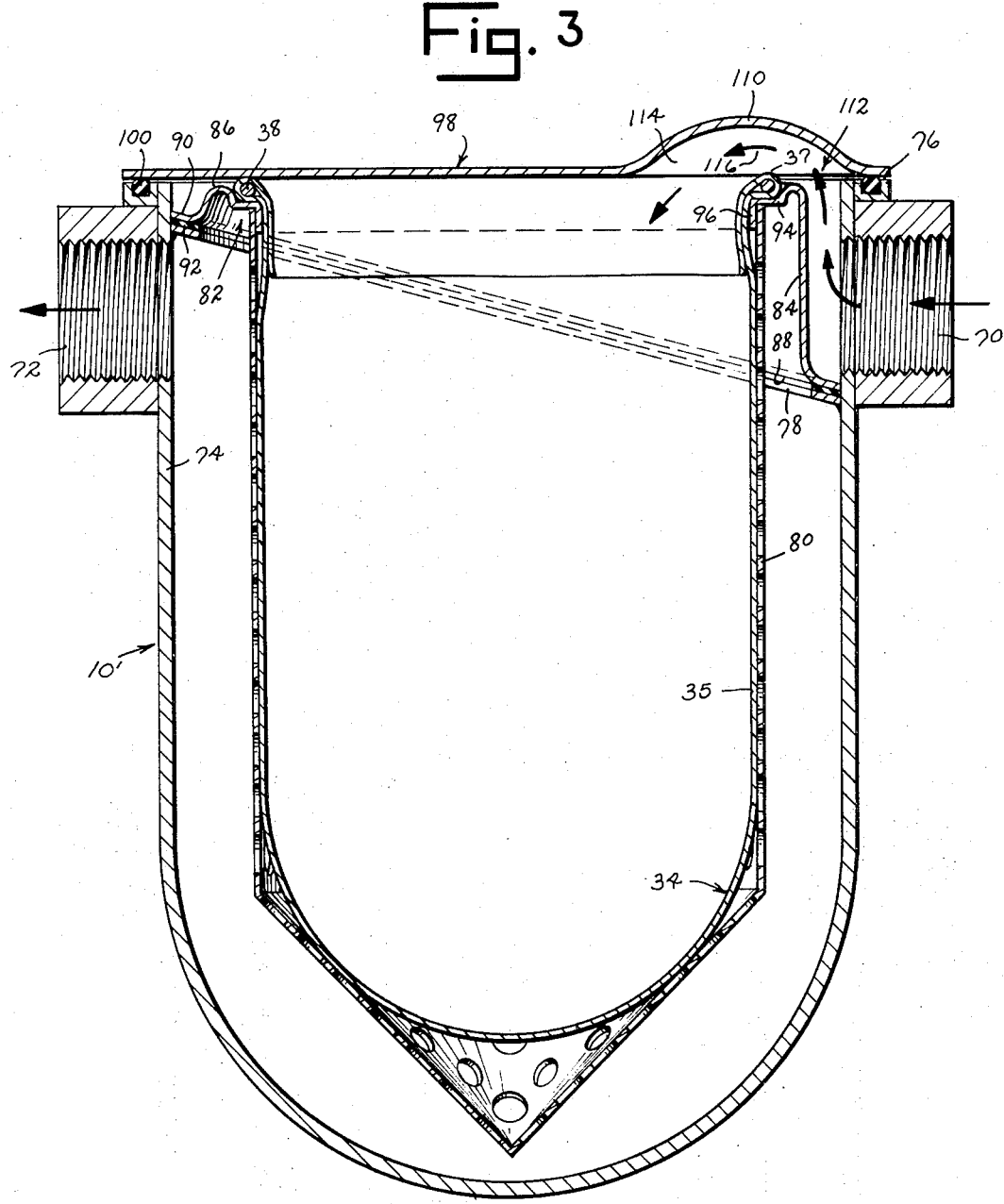

FILTER FOR LIQUID MATERIAL

SUMMARY OF THE INVENTION

This invention relates to a filter and will have specific but not limited application to a liquid filter.

The filter of this invention includes a housing having side and bottom walls with a liquid inlet formed in the side wall and a liquid outlet. A reticulated basket is fitted within the housing and supported with portions thereof spaced from the inner face of the housing side wall. A filter bag is fitted into the reticulated basket and supported therein with its upper margin making sealing contact with a top applied over the housing. The top includes an upwardly offset marginal portion which cooperates with the liquid inlet in the housing side wall to define a passage utilized to direct liquid from the inlet upwardly and over the upper edge of the filter bag and into the bag. The liquid then passes through the bag, through the reticulated basket and into the remainder of the housing and out the liquid outlet therein.

Accordingly, it is an object of this invention to provide a liquid filter which is of economical construction and which includes passage means for directing the liquid upwardly and over the upper edge of a filter bag and into the interior of the bag.

Another object of this invention is to provide a filter having a housing closed by a top which serves in conjunction with an inlet in the housing to define a fluid passage over the edge of a filter bag and into the bag.

Another object of this invention is to provide a filter having a filter bag of multiple-layered construction with each layer having a porosity differing from the other layers.

Other objects of this invention will become apparent upon a reading of the invention's description.

BRIEF DESCRIPTION OF THE DRAWINGS

FIG. 2A is a fragmentary sectional view taken along line 2A—2A of FIG. 2.

FIG. 3 is a sectional view of an alternative embodiment of the filter of this invention.

FIG. 4 is a perspective view of the filter bag utilized in the filter of this invention with a portion of the side wall of the bag cut away to illustrate the construction thereof.

FIG. 4A is a fragmentary detailed sectional view taken along line 4A—4A of FIG. 4.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
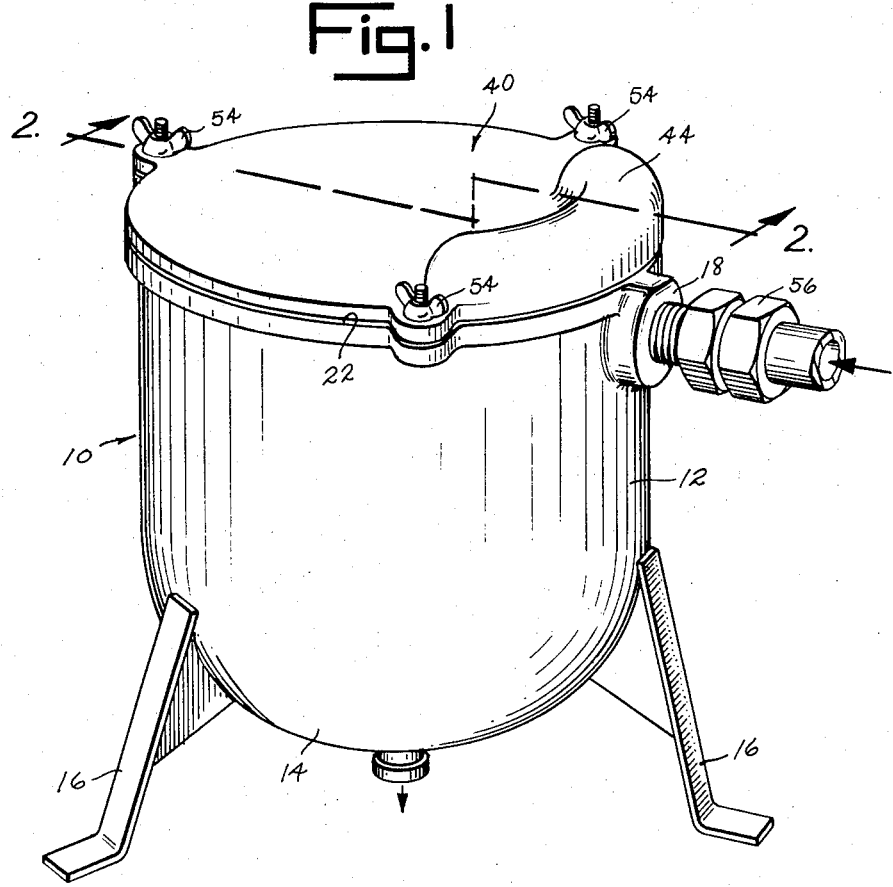
FIG. 1 is a perspective view of one embodiment of the filter of this invention.
Figure 2:
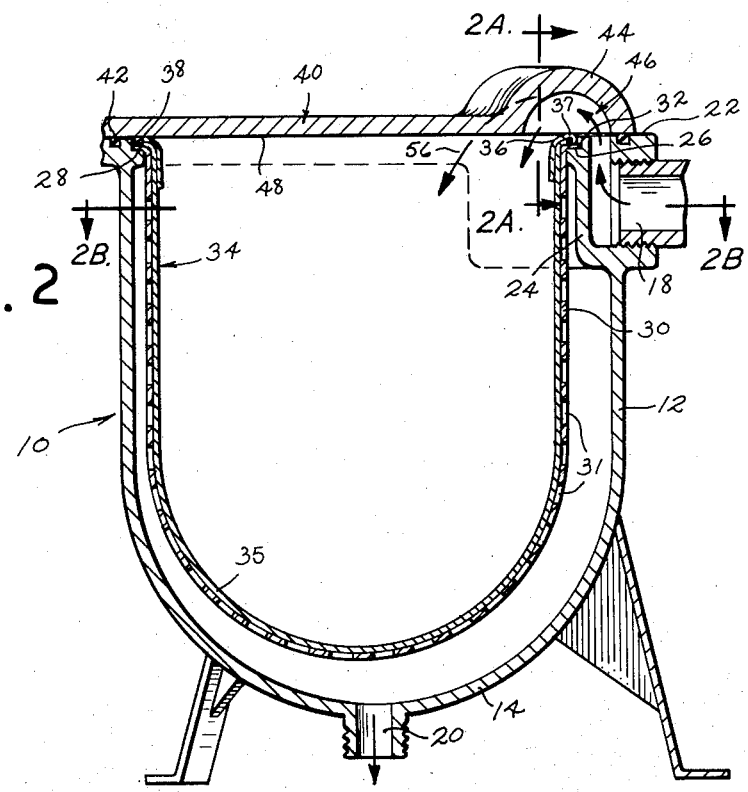
FIG. 2 is a sectional view taken along line 2—2 of FIG. 1.
Figure 2B:
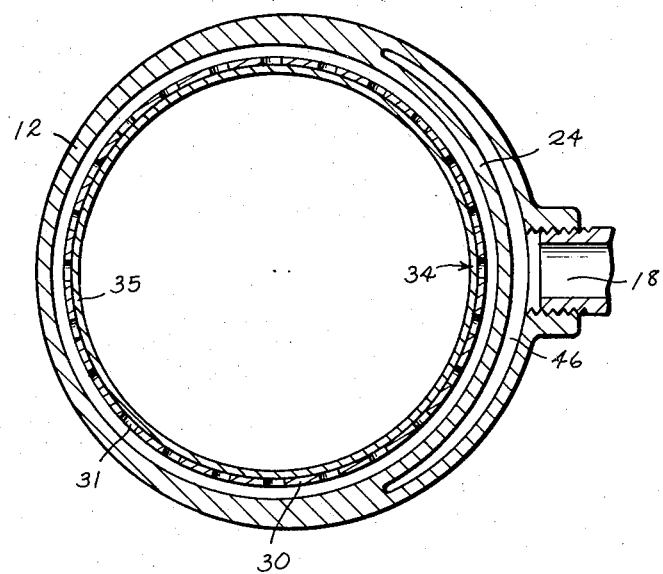
FIG. 2B is a sectional view taken along line 2B—2B of FIG. 2.

The embodiment of the filter illustrated in FIGS. 1-2B includes a housing 10 having a side wall 12 and a bottom wall 14. Housing 10 may assume a variety of configurations other than the circular bowl shape illustrated, such as an oval bowl shape and a rectangular or square box shape. Due to its rounded bottom wall 14, housing 10 is provided with three or more feet 16 which serve to support the housing in an upright position. Housing 10 includes ports 18 and 20. For purposes of describing the filter, port 18 which is located in side wall 12 next to upper edge 22 of the housing will be considered the inlet, while port 20 located in bottom wall 14 of the housing will be considered the outlet. Side wall 12 of housing 10 is of a double-walled construction at inlet port 18. This double-walled construction is formed by an inwardly offset wall part 24 which, as shown in FIGS. 2 and 2B, is joined integrally to side wall 12 at spaced locations on each side of port 18 and just below the port. A shoulder 26 is formed in wall part 24 and is circularly continuous and coplanar with a shoulder 28 formed adjacently below upper edge 22 of housing 10.

A reticulated basket 30, which may be of a wire or perforated sheet material construction having enlarged openings 31 formed therein, is fitted within housing 10 and terminates at its upper margin into a circular outturned flange 32. Basket 30 is supported in a suspended relationship within housing 10 with its flange 32 resting upon shoulders 26 and 28 of side wall 12. A filter bag 34, constructed from a porous material 35 such as felt, fits within basket 30. The upper margin 36 of bag material 35 is secured to a circular ring 38 formed of metal or of some other type of rigid material. Ring 38 is positioned above shoulders 26 and 28 of housing 10 and is seated upon flange 32 of basket 30. The depth of shoulders 26 and 28 as measured from upper edge 22 of housing 10 is so related to the thickness of flange 32 and ring 38 that the upper edge of the bag would normally project slightly above the plane of upper housing edge 22 without a cap or cover over the housing.

A cap 40 fits upon housing 10 and makes peripheral sealing engagement with an O-ring 42 seated within a groove in housing upper edge 22. Cap 40 includes an upwardly offset portion 44 which is located over offset wall part 24 of housing side wall 12 and which in conjunction with the wall part forms a passage 46 from inlet 18 upwardly over the upper edge 37 of bag 34 and into the interior of the bag. The inner face 48 of cap 40 contacts upper edge 37 of bag 34 and compresses bag material 35 and ring 38 against flange 32 of basket 30, thereby serving to fixedly seat the basket and form a peripheral seal between the upper edge of the bag and the cap except for its offset portion 44. To seat basket 30 and bag 34 upon shoulder 26 of housing offset wall part 24, offset portion 44 of cap 40 is provided with a plurality of spaced ribs 50, best seen in FIG. 2A, which serve to contact bag upper edge 37 and to urge material 35 and ring 38 of the bag and flange 32 of the basket against housing shoulder 26. Spaces 52 between ribs 50 serve as liquid openings to permit liquid to pass from inlet 18 through passage 46 and into the interior of bag 34. Wing nut hold-downs 54 or other suitable clamp means are provided to secure cap 40 to housing 10. In some constructions of this invention it may be preferable to hinge the cap to the housing. Outlets 18 and 20 may be suitably threaded to receive a coupler 56 or other type fittings.

In operation, liquid under pressure enters inlet 18 and passes upwardly over offset wall part 24 and the upper edge 37 of bag 34, as indicated by arrows 56, into the interior of the filter bag. The liquid then passes through filter bag 34 and reticulated screen 30, which serves to support the filter bag, into the housing area between basket 30 and the side wall 12 and bottom wall 14 of housing 10 where it exits through outlet 20.

Another embodiment of the filter of this invention is illustrated in FIG. 3. This filter includes a housing 10' having a liquid inlet 70 and a liquid outlet 72 formed in diametrically opposite locations in the side wall 74 of the housing, adjacent housing upper edge 76. Housing 10' includes an annular inwardly projecting flange 78 which extends peripherally about the inner face of side wall 74 and which is located in an inclined plane so that the lower edge of flange 78 is positioned adjacently below inlet 70 and the upper edge of the flange is positioned adjacently above outlet 72. A reticulated basket 80 is supported in a suspended relationship within housing 10' by means of a carrier 82 which in turn is supported upon flange 78. Carrier 82 is of a ring-shaped configuration having a side wall 84 which is defined by an upper edge 86 and a lower edge 88. The lower edge 88 of the carrier side wall is formed on an inclined plane of similar inclination to that of flange 78 of housing 10'. Carrier side wall 84 terminates at edge 88 in an outturned flange 90 which is seated over housing flange 78 and upon an annular gasket 92 which rests upon the housing flange. With lower edge 88 supported by housing flange 78, upper edge 86 of carrier side wall 84 is designed so as to generally parallel the upper edge 76 of housing 10'. Side wall 84 of carrier 82 is inset from side wall 74 of the housing and terminates adjacent carrier upper edge 86 in a shoulder 94 which terminates in a downturned flange 96. Basket 80 is welded or otherwise bonded to flange 96 of carrier 82.

A filter bag 34, which can be of the same construction as the filter bag used in the embodiment of this invention shown in FIGS. 1–2B, is fitted into basket 80 with ring 38 at its upper edge 37 resting upon and being peripherally supported by carrier shoulder 94. A cap 98 is fitted over housing 10' making peripheral sealing contact with an O-ring 100 seated within a groove at the upper edge of the housing. Cap 98 includes an upwardly projecting offset portion 110 which is located over housing inlet 70 and which in conjunction with carrier wall 84 in front of inlet 70 forms a passage 112 which extends upwardly over the upper edge 37 of filter bag 34. Offset portion 110 of cap 98 includes spaced ribs 114 which in conjunction with the inner face of the cap contact the upper edge 37 of bag 34 and compress the bag into peripheral sealing engagement with shoulder 94 of carrier 82.

Liquid, when entering inlet 70 of the filter of FIG. 3, passes upwardly over side wall 84 in front of the inlet and downwardly into the interior of bag 34, as indicated by arrows 116. The liquid then passes through porous material 35 of the filter bag and out reticulated basket 30 into the area between the basket and housing side wall 74 where it flows through outlet 72. Cap 98 can be removably secured to housing 10 by any of a variety of types of clamps or similar fittings.

A comparison of the filter illustrated in FIGS. 1–2B and in FIG. 3 reveals the similarity in function performed by offset wall part 24 of housing 10 and side wall 84 of carrier 82. In both embodiments of the filters, offset portions 44 and 110 of the caps 40 and 98 cooperate with wall portion 24 and carrier wall 84 to provide a passage for the liquid over the upper edge of the filter bag and into the bag interior. In each of the embodiments of the filter, baskets 30 and 80, as well as filter bag 34, can be removed for replacement or cleaning.

In FIGS. 4 and 4A, an embodiment of filter bag 34 is shown. Bag material 35 can consist of a plurality of layers 120a, 120b and 120c, with inner layer 120a having a porosity which is greater than the porosity of layer 120b, and with layer 120b having a porosity which is greater than the porosity of the outer layer 120c. Each layer 120a, 120b and 120c may be of a separate sack-like construction. One method of attaching the sack-like layers to ring 38 is seen in FIG. 4A. The upper marginal edges of inner layer 120a and middle layer 120b extend to ring 38, while the upper margin of outer layer 120c is folded over the ring and down against the upper margin of layer 120a. The layers are secured together by stitching 121 at their upper margins just below ring 38. It is to be understood that the number of layers of bag material can vary, depending upon the function of the filter bag. It is to be additionally understood that in each of the filters shown in FIGS. 1–3, the bag could be fitted over the outside of the baskets and the flow of fluid through the filter reversed. In this type of situation, the most porous layer of bag material would be the outermost layer, while the least porous layer of bag material would be the innermost layer. As a further modification of the filter bag 34 shown in detail in FIGS. 4 and 4A, each layer of the bag could be sewn together along the sides from top to bottom at selected spaced intervals, with only the outer layer of bag material being secured to ring 38.

It is to be understood that the invention is not to be limited to the details above given, but may be modified within the scope of the appended claims.

What I claim is:

1. A filter comprising a housing including side and bottom walls and having an open top defined by the upper edge of said side wall, said housing having two port means formed therein, one of said port means serving as a liquid inlet and the other of said port means serving as a liquid outlet, said one port means located in said side wall adjacent its said upper edge, a reticulated basket is fitted within said housing, means supporting said basket in a spaced relationship from portions of said side wall, a filter bag having an open top defined by the upper edge of said bag, said bag fitted within said basket and being supported therein at its upper edge by said support means adjacent the upper edge of said housing side wall, a cap spanning the top of said housing in peripheral sealing engagement with the upper edge of said housing side wall, said cap including an upwardly offset portion located over said one port means, the upper edge of said bag in peripheral engagement with said cap except at the offset portion thereof, said offset portion defining a liquid passage means from said one port means over the upper edge of said bag and into the interior of said bag.

2. The filter of claim 1 wherein said support means includes a peripheral shoulder carried by said side wall and located adjacent the level of the upper edge of said side wall, the upper edge of said bag overlying said shoulder and being compressed between said cap and shoulder.

3. The filter of claim 2 and a rigid ring bound in the upper edge of said bag, said ring seated upon said shoulder and compressed between said cap and shoulder.

4. The filter of claim 2 wherein said basket includes an upper edge formed into an outturned peripheral flange, said flange seated upon said shoulder, said bag upper edge overlying said flange being compressed against said flange by said cap.

5. The filter of claim 1 wherein said support means includes an offset side wall part extending from the lower edge of said one port means internally of the housing to adjacent the upper edge of said housing side wall and under said offset cap portion and there terminating in a shoulder means for supporting said basket, said offset side wall part cooperating with said offset cap portion to define said liquid passage means from said one port means into said bag.

6. The filter of claim 1 wherein said support means constitutes a carrier of ring-like configuration removably seated within said housing and having a side wall with upper and lower edges, the plane of said upper carrier edge generally paralleling said side wall upper edge, the plane of said lower carrier edge being inclined relative to the plane of the upper carrier edge, said lower carrier edge in peripheral sealing engagement with said housing side wall and extending from below said one port means to above said other port means with said upper carrier edge located adjacent said upper housing edge, said carrier supporting said basket and including a peripheral shoulder located adjacent the level of the upper edge of said housing, the upper edge of said bag overlying said shoulder and being compressed between said cap and shoulder, said carrier side wall having a portion oppositely located and inwardly spaced from said one port means, said carrier side wall portion cooperating with said offset cap portion to define said liquid passage means from said one port means into said bag.

7. The filter of claim 6 wherein said housing side wall includes an inwardly projecting flange extending about the inner surface of said side wall in an inclined plane from below said one port means to above said other port means, said lower carrier edge seated over and supported by said flange.

8. The filter of claim 6 wherein said other port means is located in said housing side wall at the opposite side of said housing from said one port means.

9. The filter of claim 8 wherein said port means are oppositely positioned adjacent the upper edge of said housing.

10. The filter of claim 1 wherein said bag is formed of a plurality of porous layers, each layer having a different porosity with the innermost layer having the greater porosity and the outermost layer having the least porosity.

11. A filter comprising a housing including side and bottom walls and having an open top defined by the upper edge of said side wall, said housing having two port means formed therein, one of said port means serving as a liquid inlet and the other of said port means serving as a liquid outlet, said one port means located in said side wall adjacent its said upper edge, a reticulated basket is fitted within said housing, means supporting said basket in a spaced relationship from portions of said side wall, a filter bag having an open top defined by the upper edge of said bag, said bag fitted within said basket and being supported therein at its upper edge by said support means adjacent the upper edge of said housing side wall, a cap spanning the top of said housing in peripheral sealing engagement with the upper edge of said housing side wall, said cap including an upwardly offset portion located over said one port means, means sealing the upper edge of said bag peripherally about said support means, said offset portion defining a liquid passage means from said one port means over the upper edge of said bag and into the interior of said bag.

12. The filter bag of claim 11 wherein said support means includes an offset side wall part extending from the lower edge of said one port means internally of the housing to adjacent the upper edge of said housing side wall and under said offset cap portion and there terminating in a shoulder means for supporting said basket, said offset side wall part cooperating with said offset cap portion to define said liquid passage means from said one port means into said bag.

13. The filter of claim 11 wherein said support means constitutes a carrier of ring-like configuration removably seated within said housing and having a side wall with upper and lower edges, the plane of said upper carrier edge generally paralleling said side wall upper edge, the plane of said lower carrier edge being inclined relative to the plane of the upper carrier edge, said lower carrier edge in peripheral sealing engagement with said housing side wall and extending from below said one port means to above said other port means with said upper carrier edge located adjacent said upper housing edge, said carrier supporting said basket and including a peripheral shoulder located adjacent the level of the upper edge of said housing, the upper edge of said bag overlying said shoulder and being compressed between said cap and shoulder, said carrier side wall having a portion oppositely located and inwardly spaced from said one port means, said carrier side wall portion cooperating with said offset cap portion to define said liquid passage means from said one port means into said bag.

* * * * *